US012731300B2

(12) United States Patent
Hsu et al.

(10) Patent No.: US 12,731,300 B2
(45) Date of Patent: Sep. 8, 2026

(54) TEXT TO IMAGE GENERATING SYSTEM AND TEXT TO IMAGE GENERATING METHOD

(71) Applicant: NATIONAL CHUNG CHENG UNIVERSITY, Chiayi (TW)

(72) Inventors: Wei-Yen Hsu, Chiayi (TW); Chien-Tzu Ni, Chiayi (TW); Jia-Yan Yang, Chiayi (TW); Jing-Wen Lin, Chiayi (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 119 days.

(21) Appl. No.: 18/930,997

(22) Filed: Oct. 29, 2024

(65) Prior Publication Data

US 2025/0322556 A1 Oct. 16, 2025

(30) Foreign Application Priority Data

Apr. 12, 2024 (TW) ................................ 113113877

(51) Int. Cl.
*G06T 11/00* (2026.01)
*G06F 40/20* (2020.01)

(52) U.S. Cl.
CPC .............. *G06T 11/00* (2013.01); *G06F 40/20* (2020.01)

(58) Field of Classification Search
CPC ................................ G06T 11/00; G06F 40/20
See application file for complete search history.

(56) References Cited

U.S. PATENT DOCUMENTS 8,370,362 B2 2/2013 Szabo

FOREIGN PATENT DOCUMENTS

| | | |
|---|---|---|
| CN | 112818950 A | 5/2021 |
| CN | 113688632 A | 11/2021 |
| TW | 202301081 A | 1/2023 |

*Primary Examiner* — Tammy Paige Goddard
(74) *Attorney, Agent, or Firm* — CKC & Partners Co., LLC

(57) ABSTRACT

A text to image generating system includes a text editor, a first stage generator, a weight processing unit, a second stage generator, a feature preserving module, a feature enhancing module and a final image forming module. The text editor is for analyzing a sentence to obtain a sentence vector, and an initial image generation condition is obtained. The first stage generator generates a plurality of first stage image feature vectors. The weight processing unit calculates a plurality of first stage updated image feature vectors. The second stage generator generates a plurality of second stage image feature vectors. The feature preserving module conducts an expanding process, a convolution process, and a channel squeezing process for the second stage image feature vectors. The feature enhancing module conducts a squeezing process and a feature enhancing process for the second stage image feature vectors. The final image forming module generates a final image.

10 Claims, 6 Drawing Sheets

TEXT TO IMAGE GENERATING SYSTEM AND TEXT TO IMAGE GENERATING METHOD

RELATED APPLICATIONS

This application claims priority to Taiwan Application Serial Number 113113877, filed Apr. 12, 2024, which is herein incorporated by reference.

BACKGROUND

Technical Field

The present disclosure relates to an image generating system and an image generating method. More particularly, the present disclosure relates to a text to image generating system and a text to image generating method.

Description of Related Art

With quick development of the technique, not only can objects be identified from an image, but an image can also be generated by inputting of conditions. The generative adversarial nets (GAN) may generate real images based on given conditions, and a text to image is defined as that the given conditions are text. For the text to image, a text is encoded to change nature language into codes that may be processed by a computer. A text editor may be used to change the codes into word embedding, and an artificial neural network may use the word embedding to calculate words and sentences. Therefore, the nature language may be changed into the word embedding to form an image generating condition, thereby generating an image which matches the sentence.

After generating the image relative to the conditions, a frame using two stages or multi-stage in one model is provided, which increases the resolution of the generated image. However, although a significant progress is obtained from these multi-stage generating methods, some problems are required to be solved. For example, the generated result of the multi-stage generation is mainly based on the quality of the front stage image, and if the result generated by the front stage is bad, an image with more details and high resolution cannot be generated later. Moreover, the words in the input sentence are deemed as the same level as being calculated, an image that matches the text more cannot be generated. Hence, some scholars provide improving methods to solve the aforementioned problems. For example, in one solution, the word features may be deemed as data of a memory network, reading the data after searching from the memory network as training, which may increase the image details in the front stage image. In another solution, a writing gate and a response gate are provided. The writing gate is used for dynamically selecting relative words for generating image, which allows the generated image to more correspond to the text description. The response gate may allow the image data to be well combined with the data in the memory network.

However, these methods focus on how to increase the image resolution and how to calculate features that match the text description, but the calculated features are not preserved. Hence, the image feature data that match the text description may be lost, the image may not be effectively generated based on the calculated features, and more calculating resources have to be used to obtain the features.

Based on the aforementioned problems, how to improve the text to image generating system and the text to image generating method to effectively generate an image with high quality and being close to a real image from text description, to remain the details and to increase the resolution of the generated image becomes a target that those in the field pursue.

SUMMARY

According to one aspect of the present disclosure, a text to image generating system includes a text editor, a first stage generator, a weight processing unit, a second stage generator, a feature preserving module, a feature enhancing module and a final image forming module. The text editor is for analyzing a sentence to obtain a plurality of word feature vectors. The word feature vectors are assembled to form a sentence vector, and an initial image generation condition is obtained according to the sentence vector. The first stage generator is signally connected to the text editor, and the first stage generator receives the initial image generation condition to generate a plurality of first stage image feature vectors. The weight processing unit is signally connected to the first stage generator, and the weight processing unit calculates a plurality of first stage updated image feature vectors based on the word feature vectors and the first stage image feature vectors. The second stage generator is signally connected to the weight processing unit, and the second stage generator receives the first stage updated image feature vectors to generate a plurality of second stage image feature vectors. The feature preserving module includes a channel excitation unit, a fast feature extracting unit and a channel squeezing unit. The channel excitation unit is signally connected to the second stage generator, and the channel excitation unit conducts an expanding process for the second stage image feature vectors to expand a number of channels of the second stage image feature vectors, thereby obtaining at least two times the number of the channels. The fast feature extracting unit is signally connected to the channel excitation unit, and the fast feature extracting unit conducts a convolution process of the second stage image feature vectors that are treated by the expanding process. The channel squeezing unit is signally connected to the fast feature extracting unit, and the channel squeezing unit conducts a channel squeezing process for the second stage image feature vectors that are treated by the convolution process, thereby reducing the number of the channels of the second stage image feature vectors. The feature enhancing module includes a squeezing unit and a feature enhancing unit. The squeezing unit is signally connected to the channel squeezing unit, and the squeezing unit conducts a squeezing process for the second stage image feature vectors that are treated by the channel squeezing process. The feature enhancing unit is signally connected to the squeezing unit, and the feature enhancing unit conducts a feature enhancing process for the second stage image feature vectors that are treated by the squeezing process. The final image forming module is signally connected to the feature enhancing module, and the final image forming module is configured for receiving a plurality of third stage image feature vectors generated after being treated by the feature preserving module and the feature enhancing module, thereby forming a final image.

According to another aspect of the present disclosure, a text to image generating method includes a first stage image feature vector generating step, a second stage image feature vector generating step, a feature preserving and enhancing step, and a final image generating step. In the first stage image feature vector generating step, a text editor analyzes a sentence to obtain a plurality of word feature vectors, the word feature vectors are assembled to form a sentence vector, an initial image generation condition is obtained according to the sentence vector, and the initial image generation condition is input to a first stage generator to generate a plurality of first stage image feature vectors. In the second stage image feature vector generating step, a plurality of first stage updated image feature vectors are calculated based on the word feature vectors and the first stage image feature vectors, and the first stage updated image feature vectors are input to a second stage generator to generate a plurality of second stage image feature vectors. The feature preserving and enhancing step includes a feature preserving substep and a feature enhancing substep. The feature preserving and enhancing step performs at least one time the feature preserving substep and the feature enhancing substep to obtain a plurality of third stage image feature vectors. In the feature preserving substep, a channel excitation unit of a feature preserving module conducts an expanding process for the second stage image feature vectors to expand a number of channels of the second stage image feature vectors, thereby obtaining at least two times the number of the channels. A fast feature extracting unit of the feature preserving module conducts a convolution process of the second stage image feature vectors that are treated by the expanding process, and a channel squeezing unit of the feature preserving module conducts a channel squeezing process for the second stage image feature vectors that are treated by the convolution process, thereby reducing the number of the channels of the second stage image feature vectors. In the feature enhancing substep, a squeezing unit of a feature enhancing module conducts a squeezing process for the second stage image feature vectors that are treated by the channel squeezing process, and a feature enhancing unit of the feature enhancing module conducts a feature enhancing process for the second stage image feature vectors that are treated by the squeezing process. In the final image generating step, a final image is generated based on the third stage image feature vectors.

BRIEF DESCRIPTION OF THE DRAWINGS

The present disclosure can be more fully understood by reading the following detailed description of the embodiment, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other element, or intervening elements may also be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
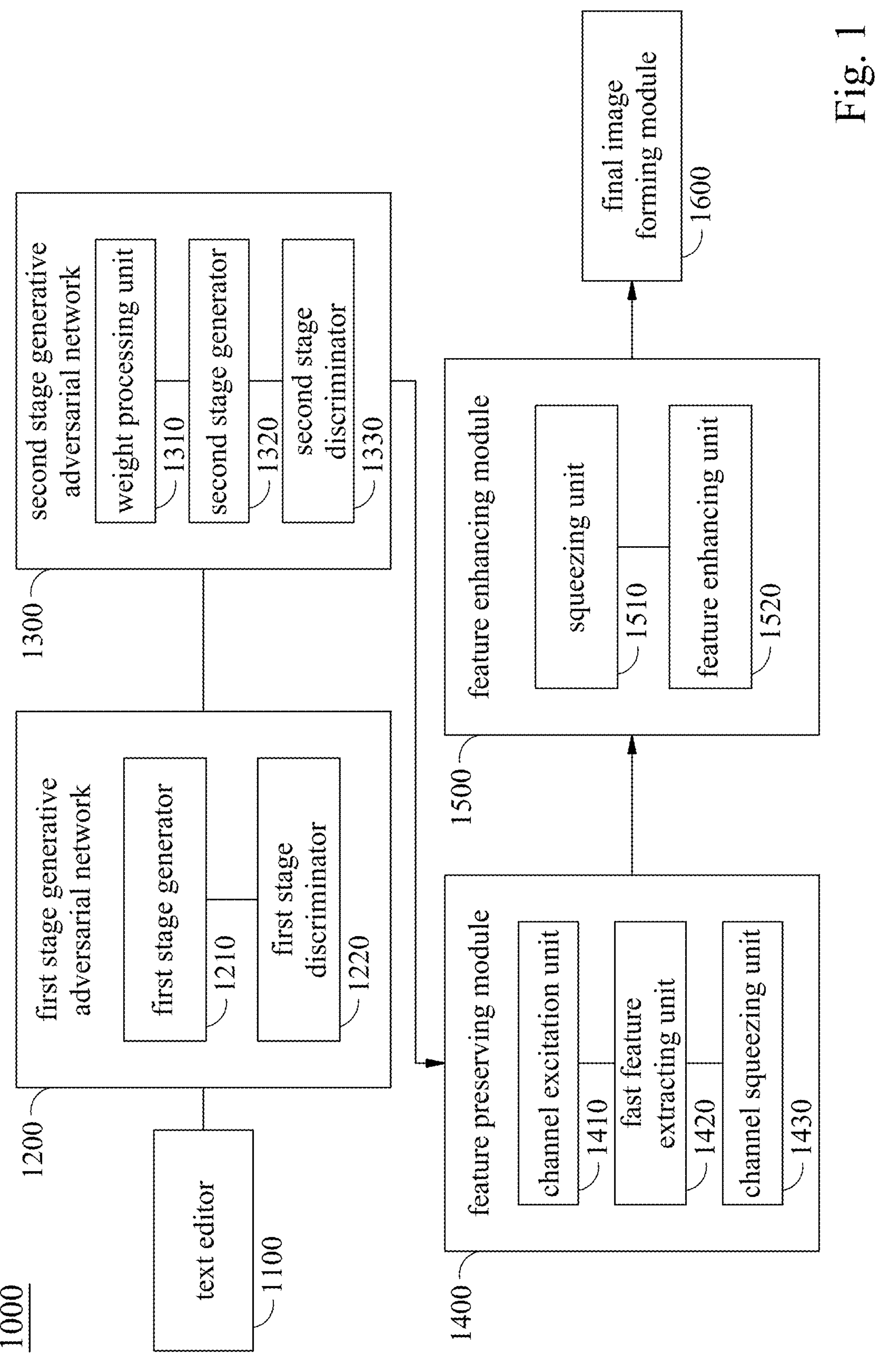
FIG. 1 is a block diagram of a text to image generating system according to one embodiment of the present disclosure.
Figure 2A:
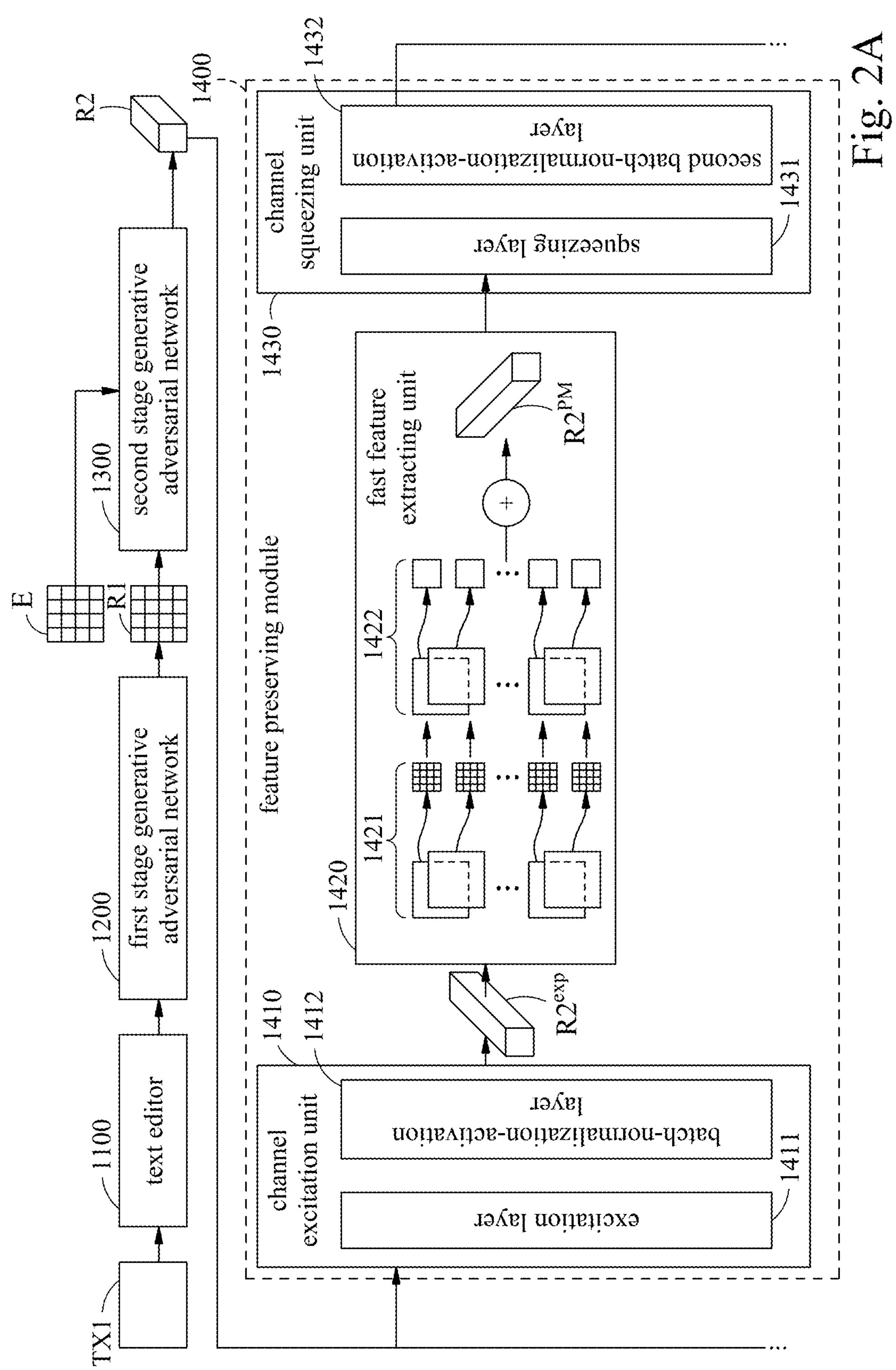
FIG. 2A is one partial detail block diagram of the text to image generating system of the embodiment of FIG. 1.
Figure 2B:
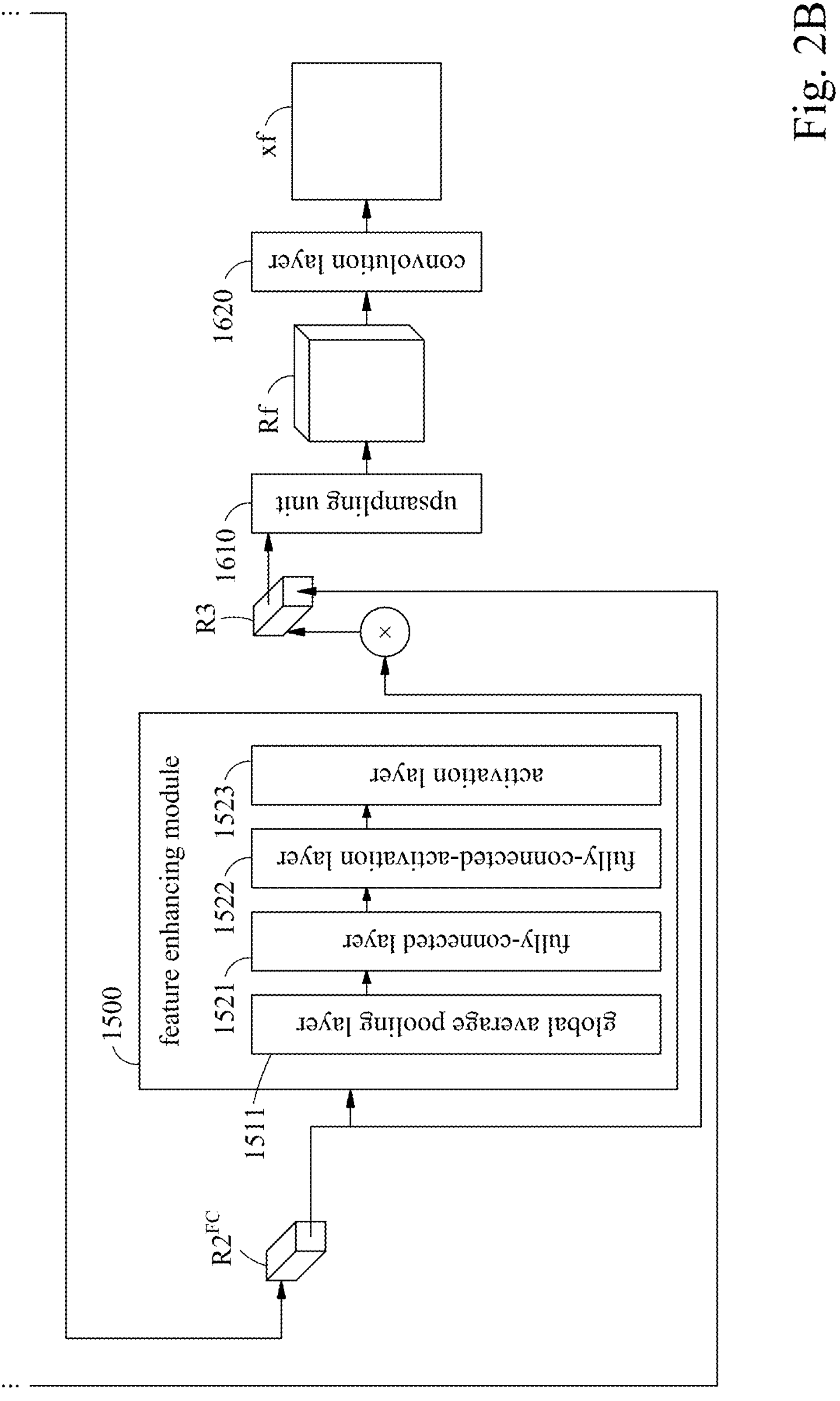
FIG. 2B is another partial detail block diagram of the text to image generating system of the embodiment of FIG. 1.

FIG. 1 is a block diagram of a text to image generating system 1000 according to one embodiment of the present disclosure. FIG. 2A is one partial detail block diagram of the text to image generating system 1000 of the embodiment of FIG. 1. FIG. 2B is another partial detail block diagram of the text to image generating system 1000 of the embodiment of FIG. 1. The text to image generating system 1000 includes a text editor 1100, a first stage generator 1210, a weight processing unit 1310, a second stage generator 1320, a feature preserving module 1400, a feature enhancing module 1500 and a final image forming module 1600.

The text editor 1100 is for analyzing a sentence TX1 to obtain a plurality of word feature vectors (represented by $e_i$). The word feature vectors $e_i$ are assembled to form a sentence vector (represented by s), and an initial image generation condition is obtained according to the sentence vector s.

The first stage generator 1210 is signally connected to the text editor 1100, and the first stage generator 1210 receives the initial image generation condition to generate a plurality of first stage image feature vectors (represented by $r1_j$). The weight processing unit 1310 is signally connected to the first stage generator 1210, and the weight processing unit 1310 calculates a plurality of first stage updated image feature vectors (represented by $r1^{new}_j$) based on the word feature vectors $e_i$ and the first stage image feature vectors $r1_j$. The second stage generator 1320 is signally connected to the weight processing unit 1310, and the second stage generator 1320 receives the first stage updated image feature $r1^{new}_j$ to generate a plurality of second stage image feature vectors (represented by $r2_j$).

The feature preserving module 1400 includes a channel excitation unit 1410, a fast feature extracting unit 1420 and a channel squeezing unit 1430. The channel excitation unit 1410 is signally connected to the second stage generator 1320, and the channel excitation unit 1410 conducts an expanding process for the second stage image feature vectors $r2_j$ to expand a number of channels of the second stage image feature vectors $r2_j$, thereby obtaining at least two times the number of the channels. The fast feature extracting unit 1420 is signally connected to the channel excitation unit 1410, and the fast feature extracting unit 1420 conducts a convolution process for the second stage image feature vectors $r2_j$ that are treated by the expanding process. The channel squeezing unit 1430 is signally connected to the fast feature extracting unit 1420, and the channel squeezing unit 1430 conducts a channel squeezing process for the second stage image feature vectors $r2_j$ that are treated by the convolution process, thereby reducing the number of the channels of the second stage image feature vectors $r2_j$.

The feature enhancing module 1500 includes a squeezing unit 1510 and a feature enhancing unit 1520. The squeezing unit 1510 is signally connected to the channel squeezing unit 1430, and the squeezing unit 1510 conducts a squeezing process for the second stage image feature vectors $r2_j$ that are treated by the channel squeezing process. The feature enhancing unit 1520 is signally connected to the squeezing unit 1510, and the feature enhancing unit 1520 conducts a feature enhancing process for the second stage image feature vectors $r2_j$ that are treated by the squeezing process. The final image forming module 1600 is signally connected to the feature enhancing module 1500, and the final image forming module 1600 is configured for receiving a plurality of third stage image feature vectors (represented by $r3_j$) generated after being treated by the feature preserving module 1400 and the feature enhancing module 1500, thereby forming a final image xf.

Therefore, with the first stage generator 1210 to generate the first stage image feature $r1_j$, a first stage image generated therefrom may have rough object features and similar color. With the weight processing unit 1310, the second stage generator 1320, the feature preserving module 1400 and the feature enhancing module 1500, the first stage image feature $r1_j$ and the word feature vector $e_i$ may be used as conditions, the generated result may match the text description of the sentence TX1, and the final image xf may have more details.

The text editor 1100 may change the sentence TX1 into a format that can be processed by a computer. The bi-directional long short-term memory (Bi-LSTM) may be used to output the word feature vectors $e_i$. Precisely, the sentence TX1 is combined by a plurality of words. The text editor 1100 may encode the sentence TX1 and the words separately, and the whole text of the sentence TX1 is embedded in a vector space. The words may be processed in both forward and backward directions. Each of the words has two hidden states. In the embodiment, the two hidden states of each of the words are connected in serial to form a serial connection representing a meaning of each of the words. The serial connection of each of the words is defined as each of the word feature vectors $e_i$, $e_i \in R^{D\times T}$. The serial connections of the words form a word feature E, $E=\{e_1, e_2, e_3, \ldots, e_T\}$, R represents the real number, D represents a dimension of the words, T represents a number of the words, and D×T=Nw represents a word feature dimension and can be 256 for example. i represents a variation and is between 1 to T. As processing the words, the last bi-directional hidden stages of the Bi-LSTM are connected in serial to form the sentence vector s, $s \in R^D$.

After generating the sentence vector s and the word feature vectors $e_i$, an average and a standard deviation of the sentence vector s may be calculated. Obtain an inner product of the obtained standard deviation and a noise vector (represented by s), and connect the inner product and the average in serial. The obtained value and another noise vector (represented by Z) are connected in serial to become the first image generating condition, $\varepsilon \in N(0,1)$ and $Z \in N(0,1)$.

The text to image generating system 1000 may include a first stage generative adversarial network 1200 including the first stage generator 1210 and a first stage discriminator 1220. The first stage discriminator 1220 is signally connected to the first stage generator 1210. The initial image generating condition is input into the first stage generator 1210. The first stage generator 1210 includes a first stage fully-connected layer (not shown) and four first stage upsampling blocks (not shown). The first stage fully-connected layer obtains the feature vectors of the first image generating condition. Each of the upsampling blocks allows the feature vectors to be processed by a nearest neighbor upsampling layer (not shown) included thereof to be enlarged two times, then be processed by a two-dimension convolution layer with a 3×3 kernel, a stride of 1 and a padding of 1, and be processed by a batch normalization layer (not shown) and a sigmoid activation function layer (not shown), thereby forming the first stage image feature vectors $r1_j$ from the first image generating condition. After which, the first stage image feature vectors $r1_j$ may be processed by another two-dimension convolution layer with a 3×3 kernel and a hyperbolic tangent function to form a first stage image.

The first stage discriminator 1220 may use a spectral normalization to improve the result of the text to image. That is to say, with that the first stage generator 1210 and the first stage discriminator 1220 generate images and discriminate images continuously, the image quality is improved, and the image with the best quality generated by the first stage generative adversarial network 1200 may be defined as the first stage image which includes rough object features and color. A size of the first stage image is 64×64. The first stage image feature vectors $r1_j$ may form the first stage image feature R1, $R1=\{r1_1, r1_2, r1_3, \ldots, r1_N\}$, $r1_j \in R^{Nr}$. j represents a variation from 1 to N. N represents a number of image pixels, Nr represents a dimension of the image features, i.e., channels, and Nr may be 64 for example.

The text to image generating system 1000 may further include a second stage generative adversarial network 1300 including the weight processing unit 1310, the second stage generator 1320 and a second stage discriminator 1330, and the second stage discriminator 1330 is signally connected to the second stage generator 1320.

The words feature vectors $e_i$ and the first stage image feature vectors $r1_j$ may form a plurality of first stage updated image feature vectors $r1^{new}{}_j$ after being processed by the weight processing unit 1310. Precisely, the first stage feature vectors $r1_j$ and the word feature vectors $e_i$ are combined to calculate the word feature weights, as shown in the condition (1).

$$d^e{}_i(r1_j, e_i) = \sigma\left(A \times e_i + B \times \frac{1}{N}\sum_{j=1}^{N} r1_j\right). \tag{1}$$

σ( ) represents an activation function, and specifically represents a sigmoid activation function in the condition (1). A is a 1×Nw array and B is a 1×Nr array. $d^e{}_i$ represents the word feature weights. After obtaining the word feature weights, the word feature vectors $e_i$ and the first stage image feature vectors $r1_j$ calculated with the word feature weights are input to a plurality of feature space with the same dimension, as shown in the condition (2).

$$m_i = Mw(e_i) * d^e{}_i + Mr\left(\frac{1}{N}\sum_{j=1}^{N} r1_j\right)(1 - d^e{}_i),\ m_i \in R^{Nm}. \tag{2}$$

Mw and Mr respectively represent a word feature selection with a 1×1 kernel and an image feature selection with a 1×1 kernel. $m_i$ represents the feature spaces in Nm dimension, and Nm may be 128 for example.

After combining the word feature vectors $e_i$ and the first stage image feature vectors $r1_j$, each of image feature weights may be calculated based on the jth first stage image feature vector $r1_j$ corresponding to the ith feature space, as shown in the condition (3).

$$\alpha_{i,j} = \frac{\exp(\phi_K(m_i)^T r1_j)}{\sum_{l=1}^{T} \exp(\phi_K(m_l)^T r1_j)}. \tag{3}$$

$\alpha_{i,j}$ represents a similarity possibility between the ith feature space and the jth first stage image feature vector $r1_j$, which is the image feature weight. $\emptyset_K$ represents a feature selection operation with the 1×1 kernel to change the dimension of the feature spaces into the dimension Nr, which is identical to the dimension of the image feature spaces. After which, the image feature weights and the feature spaces $m_i$ are calculated as the condition (4).

$$o_j = \sum_{i=1}^{T} \alpha_{i,j} \emptyset_V(m_i). \tag{4}$$

$o_j$ represents the feature spaces combining with the image feature weights. Øv represents a feature selection operation with the 1×1 kernel to change the dimension of the feature spaces into the dimension Nr, which is identical to the dimension of the image feature spaces. The feature spaces $o_j$ with the image feature weights may be combined with the corresponding image feature to form the first stage updated image feature vector $r1^{new}_j$, $r1^{new}_j=[o_j,r1_j]$, and [•, •] is a serial connection operation.

The second stage generator 1320 may include an upsampling block and a residue block. Consequently, a first stage updated image may be formed based on the first stage updated image feature vector $r1^{new}_j$, and be discriminated by the second stage discriminator 1330. Simultaneously, the first stage updated image can be input to the weight processing unit 1310 to recalculates the image feature weights, thereby increasing the image quality. The image with the best quality generated by the second stage generative adversarial network 1300 may be defined as the second stage image, and the first stage updated image feature vectors $r1^{new}_j$ corresponding thereto may be deemed as the second stage image feature vectors $r2_j$. The second stage image feature vectors $r2_j$ form the second stage image feature R2. Hence, the image features may be calculated in the process of enlarging the generated image, and the enlarged image may have more details. After which, the second stage image feature vectors $r2_j$ may be input to the feature preserving module 1400.

As shown in FIG. 2A, the channel excitation unit 1410 of the feature preserving module 1400 may include an excitation layer 1411 and a first batch-normalization-activation layer 1412 signally connected to the excitation layer 1411. The channel excitation unit 1410 may expand a number of the channels of the second stage image feature vectors $r2_j$ as the condition (5).

$$p_j = \rho(BN(C_{FE}(r2_j))),\ p_j \in R^{2Nm}. \tag{5}$$

$C_{FE}(\ )$ represents a filter with a 1×1 kernel, which may expand two times the number of the second stage image feature vectors $r2_j$ by conducting a convolution operation for each of the channels. BN( ) represents a batch-normalization. ρ( ) represents a swish activation function. $p_j$ represents the second stage image feature vectors treated by the convolution process and forming excited second stage image feature $R2^{exp}$. Therefore, the number of the channels is expanded, and a calculation may be conducted in the later feature extraction without losing original features, thereby achieving a channel-excitation effect. In addition, the network is improved as adding the batch-normalization in the process of excitation. Moreover, since a slight shift may happen in the calculation of the batch-normalization every time, the output of the network has large change. Therefore, the performance of the batch-normalization may be improved by adding the swish activation function, more image details may be obtained, and the generated image may be more close to the real image.

The fast feature extracting unit 1420 may include a depth-wise convolution layer 1421 and a point-wise convolution layer 1422 signally connected to the depth-wise convoluting layer 1421. The fast feature extracting unit 1420 may improve the method for preserving details of the image features after expanding the image features. Precisely, after expanding the dimension of the channels, the calculation cost may increase. With the depth-wise convolution layer 1421 and the point-wise convolution layer 1422, the feature extraction may be accelerated while the performance is not decreased, as shown in the conditions (6) and (7).

$$p^{DW}{}_j = C_{DW}(p_j),\ p^{DW}{}_j \in R^{2Nm}. \tag{6}$$

$$p^{PW}{}_j = C_{PW}(p^{DW}{}_j),\ p^{PW}{}_j \in R^{2Nm}. \tag{7}$$

$C_{DW}(\ )$ represents using a plurality of 1×1 kernels, a number of the 1×1 kernels being equal to the number of the channels, to conduct a depth-wise convolution operation for each of the channels and to obtain a sum thereof. $C_{PW}(\ )$ represents using a plurality of 1×1 kernels to conduct a point-wise convolution operation. $p^{DW}{}_j$ represents the second stage image feature vectors treated by the depth-wise convolution operation, and $p^{PW}{}_j$ represents the second stage image feature vectors treated by the point-wise convolution operation, thereby obtaining point-wise convoluted second stage image feature $R2^{PW}$.

The channel squeezing unit 1430 may include a squeezing layer 1431 and a second batch-normalization-activation layer 1432 signally connected to the squeezing layer 1431. The channel squeezing unit 1430 may conduct a channels-squeeze for the feature extracted image features, and the number of the channels is reduced to the number of the channels in feature fusion calculation, thereby increasing the data transition speed, as shown in the condition (8).

$$p^{FC}{}_j = \rho(BN(C_{FC}(p^{DW}{}_j))),\ p^{FC}{}_j \in R^{Nm}. \tag{8}$$

$C_{FC}(\ )$ represents using a filter of 1×1 kernels to conduct a convolution operation for reducing the number of the channels. $p^{FC}{}_j$ represents the second stage image feature vectors that are reduced, thereby obtaining reduced second stage image feature $R2^{FC}$.

After which, the feature enhancing module 1500 is operated. The feature enhancing module 1500 uses squeeze-and-excitation Networks (SE nets) to learn a data relation between the channels, which may be served as weights to dynamically adjust the features of each channel. The squeezing unit 1510 of the feature enhancing module 1500 may include a global average pooling layer 1511. For the input image features, the global average pooling layer 1511 may conduct a global average pooling operation for each input image feature, and the two-dimensional image features of each of the channels is squeezed to a global feature, thereby achieving a purpose of summarizing the number of the channels, as shown in the condition (9).

$$C = \frac{1}{H \times W} \sum_{g=1}^{H} \sum_{u=1}^{W} p^{FC}(g, u). \quad (9)$$

H and W respectively represent a length and a width. g and u are variation. C represents squeezed second stage image feature vectors.

After obtaining channel information in the squeezing process, the feature enhancing process may be operated to predict an importance of each channel. The feature enhancing unit 1520 may include a fully-connected layer 1521, a fully-connected-activation layer 1522 and an activation layer 1523. With the weights between the learned channel weights and the mapped features, the generated channel information may be applied to the input image feature. The weights from the feature enhancing process are multiplied by the original features, i.e., the reduced second stage image feature vectors $p^{FC}_j$, to further enhance the important features, and the result may be output by the feature enhancing module 1500, as shown in the conditions (10) and (11).

$$V = \delta(Q_2 \sigma(Q_1 \cdot C)). \quad (10)$$

$$r2^{new}_j = V \cdot p^{FC}_j. \quad (11)$$

$Q_1$ represents the parameter (squeezing) of the fully-connected layer 1521, and $Q_2$ represents the parameter (reducing) of the fully-connected-activation layer 1522. δ( ) represents a sigmoid activation function. σ( ) represents an activation function, and specifically represents a RELU activation function in the condition (10). $r2^{new}_j$ represents the output of the feature enhancing module 1500, and may be served as updated second stage image feature vectors for entering the feature preserving module 1400. The feature preserving module 1400 and the feature enhancing module 1500 may be repeated three times, and the last output updated second stage image feature vectors $r2^{new}_j$ are obtained.

After which, the updated second stage image feature vectors $r2^{new}_{jj}$ are multiplied by a hyperparameter, and the multiplied result may be added by the first stage image feature vectors $r1_j$ to form the third stage image feature vectors $r3_j$. The third stage image feature vectors $r3_j$ form the third stage image feature R3.

Finally, the third stage image feature vectors $r3_j$ input the final image forming module 1600. The final image forming module 1600 may include an upsampling unit 1610 and a convolution layer 1620. The upsampling unit 1610 may generate a plurality of final image feature vectors $rf_j$ to form the final image feature Rf. The convolution layer 1620 may form the final image xf based on the final image feature vectors $rf_j$.

It is noted that, as training the first stage generator 1210, the first stage discriminator 1220, the second stage generator 1320 and the second stage discriminator 1330, a loss function of generative adversarial nets and a lost function as calculating the words and the matching of the words and the image may be used. The lost function of the first stage generator 1210 and the second stage generator 1320 is shown in the condition (12), and the lost function of the first stage discriminator 1220 and the second stage discriminator 1330 is shown in the condition (13)

$$L_{G_j} = -\frac{1}{2}\left[E_{x \sim PG_j} \log D_j(x) + E_{x \sim PG_j} D_j(x, s)\right]. \quad (12)$$

The front item of the condition (12) represents an unconditional loss, which is used to allow the generated image to be close to the real image. The rear item of the condition (12) represents a conditional loss, which matches the generated image with the input sentence TX1.

$$L_{D_j} = -\frac{1}{2}\left[E_{x \sim Pdata} \log D_j(x) + E_{x \sim PG_j} \log(1 - D_j(x)) + E_{x \sim Pdata} \log D_j(x, s) + E_{x \sim PG_j} \log(1 - D_i(x, s))\right]. \quad (13)$$

The front item of the condition (13) represents an unconditional loss, which is used to judge whether the generated image is close to the real image. The rear item of the condition (13) represents a conditional loss, which is used to judge whether the generated image matches with the input sentence TX1.

It is further noted that, in the disclosure, a processor may be programed to conduct relative operations. The processor may be a central processing unit (CPI), a digital signal processor (DSP), a micro processing unit (MPU) or a micro controlling unit (MCU), which may be programmable to achieve specific functions. A number of the processor may be one or more than one and the processors are signally connected to each other, but the present disclosure is not limited thereto.

Figure 3:
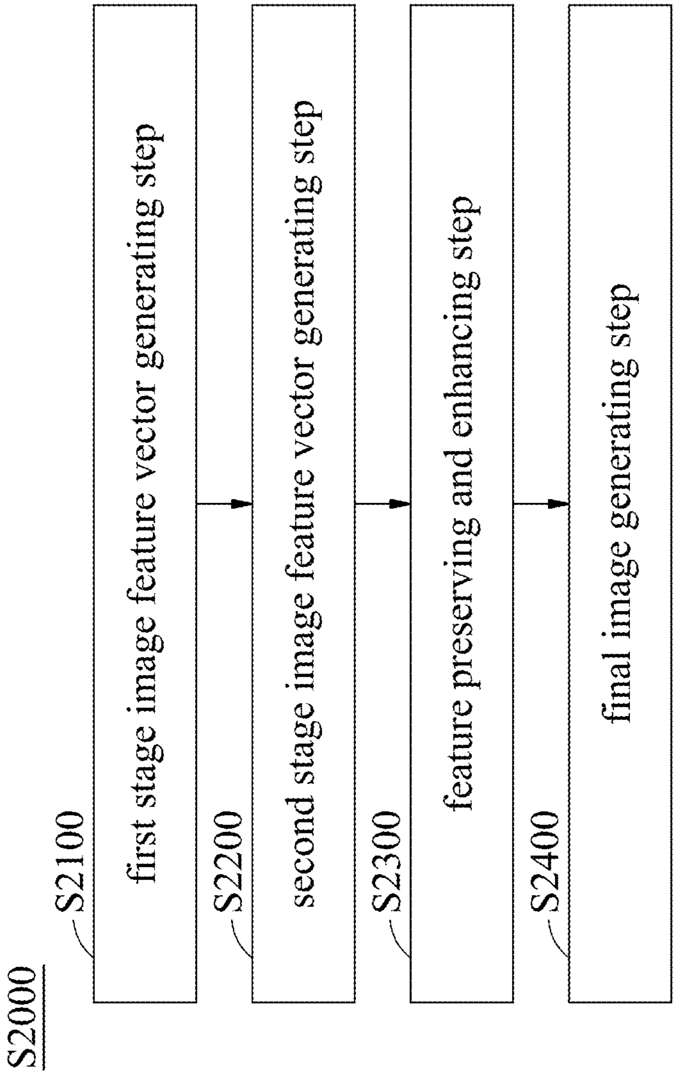
FIG. 3 is a process block diagram of a text to image generating method according to another embodiment of the present disclosure.
Figure 4:
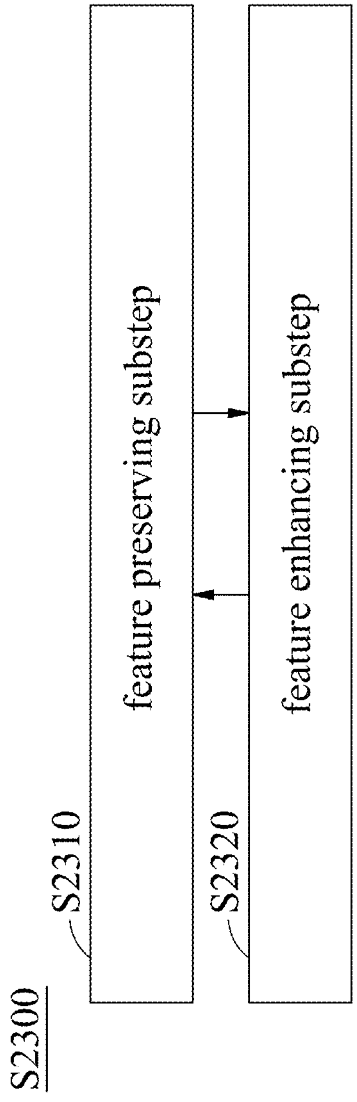
FIG. 4 is a substep process diagram of a feature preserving and enhancing step of the text to image generating method of the embodiment of FIG. 3.

FIG. 3 is a process block diagram of a text to image generating method S2000 according to another embodiment of the present disclosure. FIG. 4 is a substep process diagram of a feature preserving and enhancing step S2300 of the text to image generating method S2000 of the embodiment of FIG. 3. The text to image generating method S2000 includes a first stage image feature vector generating step S2100, a second stage image feature vector generating step S2200, a feature preserving and enhancing step S2300, and a final image generating step S2400. The details of the text to image generating method S2000 may be described with the text to image generating system 1000 in FIGS. 1, 2A and 2B.

In the first stage image feature vector generating step S2100, the text editor 1100 analyzes the sentence TX1 to obtain the word feature vectors $e_i$, the word feature vectors $e_i$ are assembled to the sentence vector s, the initial image generation condition is obtained according to the sentence vector s, and the initial image generation condition is input to the first stage generator 1210 to generate the first stage image feature vectors $r1_j$.

In the second stage image feature vector generating step S2200, the first stage updated image feature vectors $r1^{new}_j$ are calculated based on the word feature vectors $e_i$ and the first stage image feature vectors $r1_j$, and the first stage updated image feature vectors $r1^{new}_j$ are input to the second stage generator 1320 to generate the second stage image feature vectors $r2_j$.

The feature preserving and enhancing step S2300 includes the feature preserving substep S2310 and the feature enhancing substep S2320. The feature preserving and enhancing step S2300 performs at least one time the feature preserving substep S2310 and the feature enhancing substep S2320 to obtain the third stage image feature vectors $r3_j$. In the feature preserving substep S2310, the channel excitation unit 1410 of the feature preserving module 1400 conducts the expanding process for the second stage image feature vectors $r2_j$ to expand the number of the channels of the second stage image feature vectors $r2_j$, thereby obtaining at least two times the number of the channels. The fast feature extracting unit 1420 of the feature preserving module 1400 conducts the convolution process of the second stage image feature vectors $r2_j$ that are treated by the expanding process, and the channel squeezing unit 1430 of the feature preserving module 1400 conducts the channel squeezing process for the second stage image feature vectors $r2_j$ that are treated by the convolution process, thereby reducing the number of the channels of the second stage image feature vectors $r2_j$. In the feature enhancing substep S2320, the squeezing unit 1510 of the feature enhancing module 1500 conducts the squeezing process for the second stage image feature vectors $r2_j$ that are treated by the channel squeezing process, and the feature enhancing unit 1520 of the feature enhancing module 1500 conducts the feature enhancing process for the second stage image feature vectors $r2_j$ that are treated by the squeezing process.

In the final image generating step S2400, the final image xf is generated based on the third stage image feature vectors $r3_j$.

Precisely, the sentence TX1 is processed to form the sentence vector s and the word feature vectors $e_i$. After which, the average and the standard deviation of the sentence vector s may be calculated. Obtain the inner product of the obtained standard deviation and the noise vector ε first, and then connect the inner product and the average in serial. Finally, the obtained value and another noise vector Z are connected in serial to become the first image generating condition. The initial image generating condition may be input to the first stage generator 1210 to generate the first stage image, the first stage discriminator 1220 discriminates the first stage image, and the first stage image with the best quality is generated by repeating the process. The first stage image includes slight object features and colors.

Subsequently, in the second stage image feature vector generating step S2200, the word feature weights are calculated based on the word feature vectors $e_i$ and the first stage image feature vectors $r1_j$. The word feature vectors $e_i$ and the first stage image feature vectors $r1_j$ calculated with the word feature weights are input to the feature spaces with the same dimension, and the image feature weights are calculated based on the first stage image feature vectors $r1_j$ corresponding to the feature spaces. The weight feature spaces are calculated based on the feature spaces and the image feature weights, and each of the weight feature spaces is combined with each of the first stage image feature vectors $r1_j$, thereby forming the first stage updated image feature vectors $r1^{new}_j$ as shown in the conditions (1) to (4).

After which, the first stage updated image feature vectors $r1^{new}_j$ may be input the feature preserving module 1400 and the feature enhancing module 1500, and the feature preserving substep S2310 and the feature enhancing substep S2320 are performed. In the feature preserving substep S2310, the convolution process includes the depth-wise convolution operation and the point-wise convolution operation. In the feature enhancing substep S2320, the squeezing unit 1510 includes the global average pooling layer 1511 to conduct the squeezing process. The feature preserving and enhancing step S2300 may perform the conditions (5) to (11), and the feature preserving substep S2310 and the feature enhancing substep S2320 are performed three times to obtain the third stage image feature vectors $r3_j$. Finally, in the final image forming step S2400, the third stage image feature vectors $r3_j$ are input to the final image forming module 1600. The final image feature vectors $rf_j$ are generated by the upsampling unit 1610 and the convolution layer 1620 of the final image forming module 1600, thereby forming the final image xf.

Figure 6:
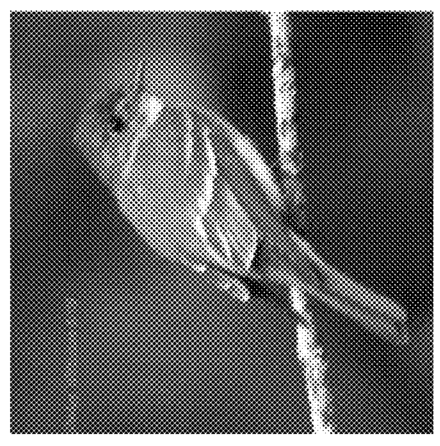
FIG. 6 is a real image.
Figure 5:
FIG. 5 is a final image generated by the text to image generating method of the embodiment of FIG. 3.

FIG. 5 is a final image generated by the text to image generating method S2000 of the embodiment of FIG. 3. FIG. 6 is a real image. In the final image of FIG. 5, details of feather patterns, eyes and long feet may be fully illustrated. The final image satisfies the text description, and a complete object is generated and is very close to the real image of FIG. 6. Therefore, it is known that the text to image generating method S2000 of the present disclosure can generate an image with high quality and being close the real image from the text description.

Based on the aforementioned embodiments, the text to image generating system and the text to image generating method can effectively preserve the calculated image feature information that matches the text description during training, and thus the image with high quality and more details can be generated.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A text to image generating system, comprising:

a text editor for analyzing a sentence to obtain a plurality of word feature vectors, wherein the word feature vectors are assembled to form a sentence vector, and an initial image generation condition is obtained according to the sentence vector;

a first stage generator signally connected to the text editor, the first stage generator receiving the initial image generation condition to generate a plurality of first stage image feature vectors;

a weight processing unit signally connected to the first stage generator, the weight processing unit calculating a plurality of first stage updated image feature vectors based on the word feature vectors and the first stage image feature vectors;

a second stage generator signally connected to the weight processing unit, the second stage generator receiving the first stage updated image feature vectors to generate a plurality of second stage image feature vectors;

a feature preserving module, comprising:

a channel excitation unit signally connected to the second stage generator, the channel excitation unit conducting an expanding process for the second stage image feature vectors to expand a number of channels of the second stage image feature vectors, thereby obtaining at least two times the number of the channels;

a fast feature extracting unit signally connected to the channel excitation unit, the fast feature extracting unit conducting a convolution process of the second stage image feature vectors that are treated by the expanding process; and a channel squeezing unit signally connected to the fast feature extracting unit, the channel squeezing unit conducting a channel squeezing process for the second stage image feature vectors that are treated by the convolution process, thereby reducing the number of the channels of the second stage image feature vectors;

a feature enhancing module, comprising:

a squeezing unit signally connected to the channel squeezing unit, the squeezing unit conducting a squeezing process for the second stage image feature vectors that are treated by the channel squeezing process; and a feature enhancing unit signally connected to the squeezing unit, the feature enhancing unit conducting a feature enhancing process for the second stage image feature vectors that are treated by the squeezing process; and a final image forming module signally connected to the feature enhancing module, the final image forming module configured for receiving a plurality of third stage image feature vectors generated after being treated by the feature preserving module and the feature enhancing module, thereby forming a final image.

2. The text to image generating system of claim 1, wherein the fast feature extracting unit comprises a depth-wise convolution layer and a point-wise convolution layer signally connected to the depth-wise convoluting layer.

3. The text to image generating system of claim 1, wherein the feature enhancing unit comprises a fully-connected layer, a fully-connected-activation layer, and an excitation layer.

4. The text to image generating system of claim 1, wherein the squeezing unit comprises a global average pooling layer.

5. The text to image generating system of claim 1, further comprising a first stage discriminator and a second stage discriminator, the first stage discriminator is signally connected to the first stage generator, and the second stage discriminator is signally connected to the second stage generator.

6. A text to image generating method, comprising a first stage image feature vector generating step, wherein a text editor analyzes a sentence to obtain a plurality of word feature vectors, the word feature vectors are assembled to form a sentence vector, an initial image generation condition is obtained according to the sentence vector, and the initial image generation condition is input to a first stage generator to generate a plurality of first stage image feature vectors;

a second stage image feature vector generating step, wherein a plurality of first stage updated image feature vectors are calculated based on the word feature vectors and the first stage image feature vectors, and the first stage updated image feature vectors are input to a second stage generator to generate a plurality of second stage image feature vectors;

a feature preserving and enhancing step, comprising a feature preserving substep and a feature enhancing substep, the feature preserving and enhancing step performing at least one time the feature preserving substep and the feature enhancing substep to obtain a plurality of third stage image feature vectors, wherein:

in the feature preserving substep, a channel excitation unit of a feature preserving module conducts an expanding process for the second stage image feature vectors to expand a number of channels of the second stage image feature vectors, thereby obtaining at least two times the number of the channels, a fast feature extracting unit of the feature preserving module conducts a convolution process of the second stage image feature vectors that are treated by the expanding process, and a channel squeezing unit of the feature preserving module conducts a channel squeezing process for the second stage image feature vectors that are treated by the convolution process, thereby reducing the number of the channels of the second stage image feature vectors; and in the feature enhancing substep, a squeezing unit of a feature enhancing module conducts a squeezing process for the second stage image feature vectors that are treated by the channel squeezing process, and a feature enhancing unit of the feature enhancing module conducts a feature enhancing process for the second stage image feature vectors that are treated by the squeezing process; and a final image generating step, wherein a final image is generated based on the third stage image feature vectors.

7. The text to image generating method of claim 6, wherein in the second stage image feature vector generating step, a weight processing unit calculates a plurality of word feature weights based on the word feature vectors and the first stage image feature vectors, the word feature vectors and the first stage image feature vectors calculated with the word feature weights are input to a plurality of feature spaces with the same dimension, a plurality of image feature weights are calculated based on the first stage image feature vectors corresponding to the feature spaces, a plurality of weight feature spaces are calculated based on the feature spaces and the image feature weights, and each of the weight feature spaces is combined with each of the first stage image feature vectors, thereby forming the first stage updated image feature vectors.

8. The text to image generating method of claim 6, wherein in the feature preserving substep, the convolution process comprises a depth-wise convolution operation and a point-wise convolution operation.

9. The text to image generating method of claim 6, wherein in the feature enhancing substep, the squeezing unit comprises a global average pooling layer.

10. The text to image generating method of claim 6, wherein the feature preserving substep and the feature enhancing substep are performed three times to obtain the third stage image feature vectors.

* * * * *